(12) United States Patent
Bragg et al.

(10) Patent No.: US 6,223,769 B1
(45) Date of Patent: May 1, 2001

(54) GAS PRESSURE SENSOR AND INDICATOR APPARATUS FOR RECREATIONAL VEHICLES AND THE LIKE

(75) Inventors: John C. Bragg, Grand Rapids, MI (US); Ruth H. Heckler, Austin, TX (US)

(73) Assignee: S. H. Leggitt Company, San Marcos, TX (US)

( * ) Notice: Subject to any disclaimer, the term of this patent is extended or adjusted under 35 U.S.C. 154(b) by 0 days.

(21) Appl. No.: 09/406,564

(22) Filed: Sep. 27, 1999

Related U.S. Application Data

(60) Provisional application No. 60/102,062, filed on Sep. 28, 1998.

(51) Int. Cl.[7] .................................................. F16K 37/00
(52) U.S. Cl. .......................... 137/557; 137/113; 137/351
(58) Field of Search ..................................... 137/557, 113, 137/351

(56) References Cited

U.S. PATENT DOCUMENTS

| | | |
|---|---|---|
| 2,747,042 | 5/1956 | Zimmerman . |
| 2,772,409 | 11/1956 | Reid . |
| 3,101,068 | 8/1963 | Jensen . |
| 3,517,693 | 6/1970 | Dietz . |
| 3,549,837 | 12/1970 | Barnes et al. . |
| 3,965,317 | 6/1976 | Gratzmuller . |
| 4,181,835 | 1/1980 | Stadler et al. . |
| 4,223,692 | 9/1980 | Perry . |
| 4,450,721 | 5/1984 | Gaunt et al. . |
| 4,603,707 | 8/1986 | Gregoire et al. . |
| 4,763,114 | 8/1988 | Eidsmore . |
| 4,921,008 | 5/1990 | Foster . |
| 4,989,832 | 2/1991 | Kremer . |
| 4,993,451 | 2/1991 | Kremer . |
| 5,019,678 | 5/1991 | Templeton et al. . |
| 5,037,063 | 8/1991 | Kerger et al. . |
| 5,057,822 | 10/1991 | Hoffman . |
| 5,070,220 | 12/1991 | Glenn . |
| 5,487,404 | 1/1996 | Kerger . |
| 5,868,162 | * 2/1999 | Dickerson, Jr. ....................... 137/557 |

* cited by examiner

Primary Examiner—Kevin Lee
(74) Attorney, Agent, or Firm—Price, Heneveld, Cooper, DeWitt & Litton

(57) ABSTRACT

A remote sensing and indicating apparatus for a conventional two-stage changeover gas regulator having a mechanical full/empty indicator and at least one inlet for receiving gas from at least one gas storage container. The apparatus includes a housing, retrofittable to the regulator, for accommodating a sensor. The sensor converts the mechanical movement of a pressure sensitive diaphragm and an indicating member biased thereagainst, of the full/empty indicator, into an electrical signal indicative of the "full/empty" status of the supply container. Within the housing, the sensing apparatus includes a plunger movably arranged therein, and biased against the indicating member such that the plunger is collectively movable with the indicating member and diaphragm in response to a change in gas pressure. At least a portion of the plunger is a magnetic material, while the switching element is responsive to the magnetic field generated by the plunger such that the movement of the plunger controls the conducting state of the switching element for generating an output signal indicative of the gas pressure sensed by the diaphragm. When the supply gas container is at or near empty (i.e., the sensed gas pressure is low), the sensor transmits an output signal to an indicator, such as a lighting element, to notify the user that a changeover to a reserve gas container has occurred and that the initially selected supply container requires refilling.

17 Claims, 3 Drawing Sheets

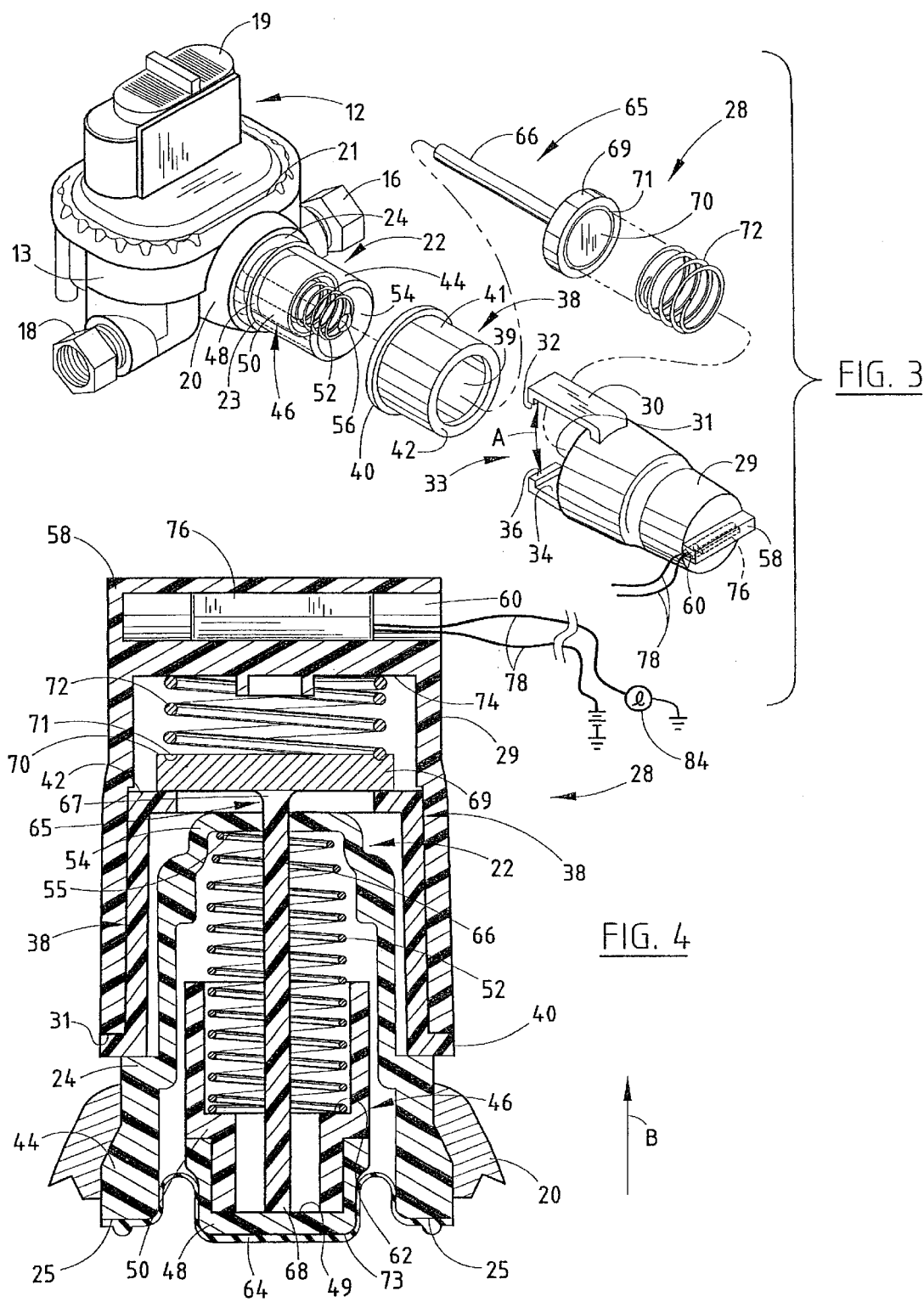

US 6,223,769 B1

GAS PRESSURE SENSOR AND INDICATOR APPARATUS FOR RECREATIONAL VEHICLES AND THE LIKE

CROSS-REFERENCES TO RELATED APPLICATIONS

This application claims the benefit of U.S. Provisional Application Ser. No. 60/102,062, filed Sep. 28, 1998, the entire contents of which are hereby incorporated herein by reference.

BACKGROUND OF THE INVENTION

The present invention relates to pressure-sensing and indicating units for gas systems and, more particularly, to remote indicator units for indicating the full/empty status of at least one pressurized gas source such as an L.P. gas tank.

Automatic changeover two-stage LP gas regulators are widely known and used to provide gas to selected appliances at a stepped-down pressure. Automatic changeover regulators, such as the Marshall Gas Controls Model 250, typically include a high-pressure changeover regulator that includes at least one inlet for receiving gas from a pressurized container, reduces the gas pressure to a first predetermined level, and transmits that gas to a second, low-pressure regulator. The low-pressure regulator further reduces the gas pressure to a predetermined level prior to conveying the gas through an outlet to, e.g., an appliance.

In many applications, and particularly in the Recreational Vehicle ("RV") field, at least two gas source containers (a "supply" container and a "reserve" container) are connected to at least two corresponding inlets at the first high-pressure regulator, each inlet for receiving gas from a different gas source container. During use of the connected appliance, when the supply container becomes depleted of gas, the regulator automatically changes over to the reserve container such that the reserve container becomes the "new supply" container for providing gas to the regulator. After such a changeover, the original supply container can be disconnected from the corresponding inlet of the regulator and be refilled.

To notify the user of a changeover to the reserve container, known regulators of this type preferably have a mechanical full/empty indicator attached to the high-pressure regulator. This indicator typically includes a pressure-sensitive member, e.g., a diaphragm, that is responsive to the pressure of the gas received through the inlet associated with the supply container. The indicator also typically includes a bi-colored or other such indicator member that is mounted and displayed in a transparent capsule attached adjacent to the high-pressure changeover regulator such that the indicator member abuts or is coupled to the diaphragm. As the diaphragm moves (i.e., deflects) in response to changes in pressure, the diaphragm exerts a force on the bi-colored member. As a result, the diaphragm causes translational movement of such member to display a portion of the member having a color indicative of the "full/empty" status of the supply container. For example, when the supply container is depleted of gas after extensive use, the low gas pressure sensed by the diaphragm causes the diaphragm to deflect accordingly and thus cause corresponding movement of the bi-colored or other indicator member to display a portion of such member that indicates that the supply container should be disconnected and refilled.

A shortcoming of such mechanical full/empty indicators is that the regulator and gas supply containers are typically stored at a remote location that is not often or typically accessed, e.g., outside the cab or occupied interior space of a recreational vehicle, such that the user has to exit the cab and make a special effort to inspect the gas containers, including the regulator and indicator attached thereto, to determine whether the automatic changeover has been triggered. Since the supply system is usually placed out of the way, e.g., behind doors, in a cabinet, etc., the full/empty indicator is not ordinarily viewable. Since the changeover is automatic and only occurs at spaced intervals and on an irregular basis, and may occur at night, the condition may go undetected for some time, leading to unexpected depletion of the reserve container.

Therefore, an indicator is needed that conveniently notifies the user at an often-occupied remote location that the supply container is at or near empty, such that the user does not have to continuously and unnecessarily check the full/empty status of the gas container(s) at their out-of-the-way location. The desired indicator should also be inexpensively retrofittable to commonly known gas systems, such as those using the Marshall Gas Controls Model 250 switching regulator, but also could be manufactured as part of the regulator for new installations.

SUMMARY OF THE INVENTION

The present invention overcomes the disadvantages of and improves upon known gas systems by providing a sensing apparatus for generating a transmittable signal indicative of whether a gas container, and especially one connected to a conventional two-stage LP gas regulator, is at or near empty. In a preferred embodiment, the sensing apparatus converts the mechanical movement of a conventional full/empty indicator into an electrical signal and transmits that signal to an indicator at a remote location for indicating whether the gas container is depleted or empty; for example, by actuating a lighting element. The sensing apparatus is directly retrofittable to known regulators, without modifying the regulator, to provide a cost effective device that can be readily attached to an existing gas supply system.

According to the preferred embodiment, the sensing apparatus is an improvement on the mechanical full/empty indicator included on a conventional two-stage changeover-type gas regulator that has at least two inlets for receiving gas from at least two gas storage containers. The sensing apparatus includes a sensor housing disposed on the full/empty indicator and releasably connected to the regulator. A sensor is mounted in the sensor housing and is responsive to the movement of the full/empty indicator by generating an output signal indicative of the gas pressure sensed by a diaphragm of the indicator.

According to another aspect of the invention, the sensor includes a plunger and a switching element, both maintained within the sensor housing, wherein the plunger is coupled to the indicating member of the mechanical full/empty indicator such that the plunger is conjointly movable with the indicating member in response to the pressure sensed by the diaphragm. Notably, at least a portion of the plunger is or has a magnetic material and the switching element is magnetically responsive such that position of the plunger controls the conducting state of the switching element for generating an output signal indicative of the gas pressure sensed by the diaphragm.

According to a still further aspect of the invention, a sensing and indicating apparatus for a changeover gas regulator includes the housing and sensing device of the preferred embodiment for converting the mechanical movement of at least a portion of the full/empty indicator into an electrical signal indicative of the gas pressure sensed by the diaphragm of the full/empty indicator. In addition, the apparatus includes an indicator, such as a lighting element, that is responsive to the electrical signal. For example, when the main or principal gas container is at or near empty, the sensed gas pressure is low and the sensing apparatus transmits an output signal to the indicator notifying the user that a changeover to a reserve container has occurred and that the initially selected supply container requires refilling.

These and other features, advantages and objects of the present invention will be further understood and appreciated by those skilled in the art by reference to the following specification, claims and appended drawings.

BRIEF DESCRIPTION OF THE DRAWINGS

FIG. 3 is an exploded perspective view showing a portion of the apparatus shown in FIG. 2, illustrating the serial assembly of the components of the sensing apparatus to the regulator;

FIG. 4 is an enlarged cross-sectional view taken along the plane IV—IV of FIG. 2 and viewed in the direction of the arrows;

DETAILED DESCRIPTION OF PREFERRED EMBODIMENT

Figure 1:
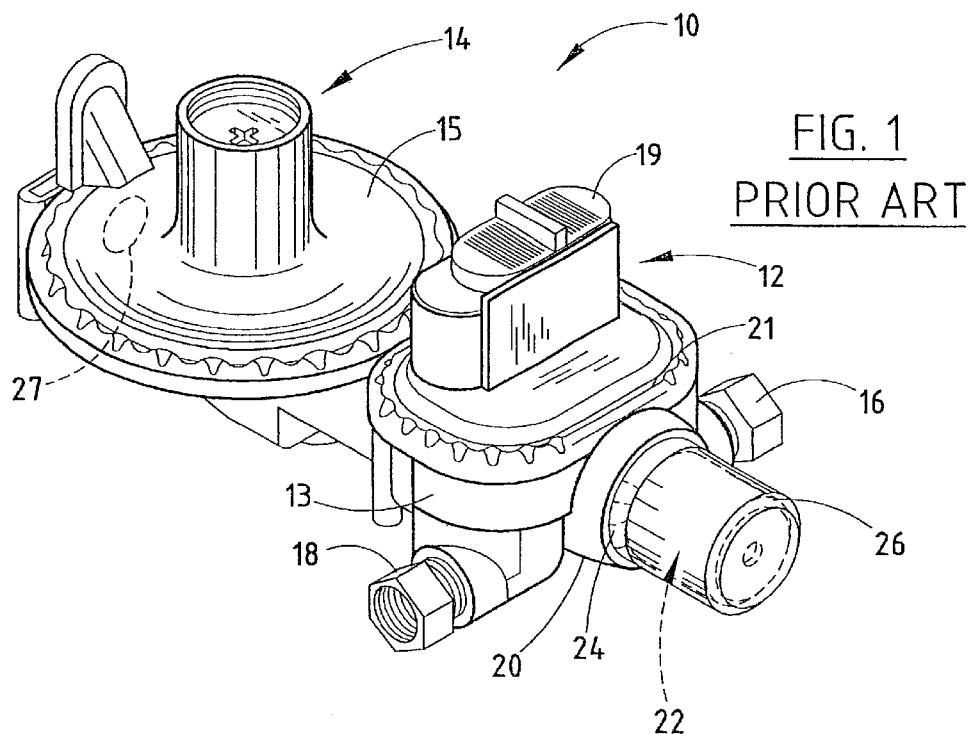
FIG. 1 is a perspective view of a known two-stage LP gas regulator having a full/empty indicator.
Figure 2:
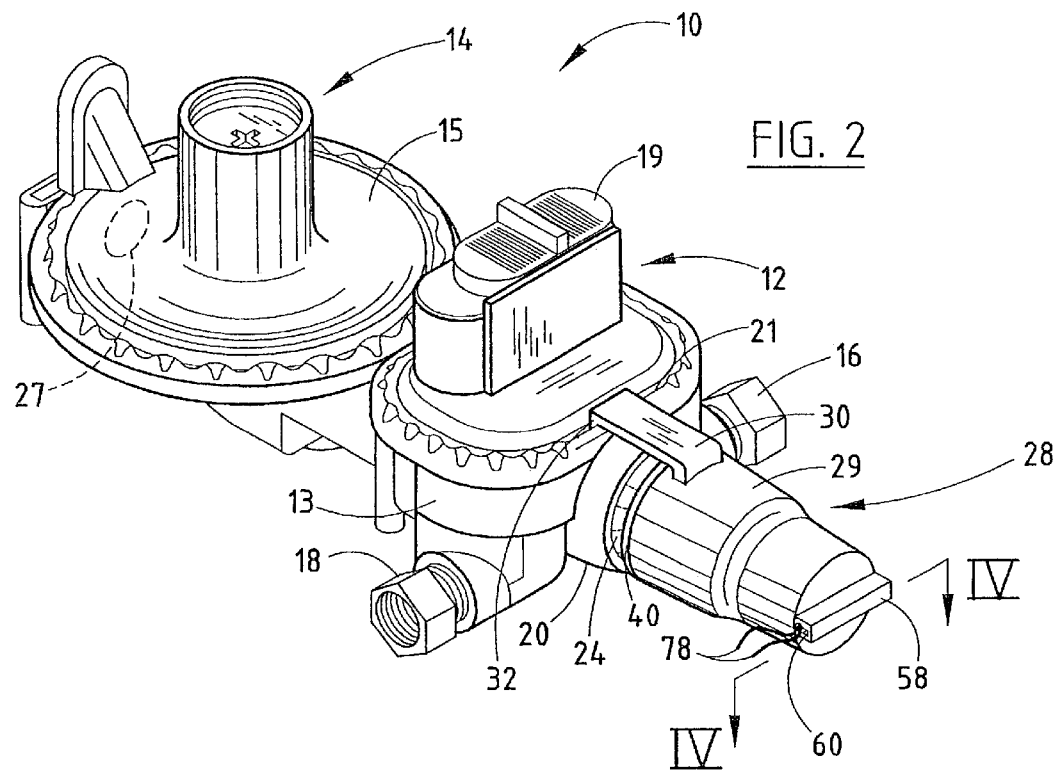
FIG. 2 is a perspective view of the FIG. 1 device, together with a sensing apparatus in accordance with the present invention, illustrating the engagement between the housing of the sensing apparatus and the regulator.

Referring to the drawings, and in particular to FIG. 1, a conventional two-stage LP gas regulator 10 includes a first regulation portion 12 having a high-pressure changeover regulator 13 and a second regulation portion 14 having a low-pressure regulator 15. The first regulation portion 12 includes a pair of inlets 16, 18 each of which receives gas from a separate gas storage container (not shown). First portion 12 of regulator 10 also includes a slide bar 19 for selecting which inlet 16, 18 supplies the gas to high-pressure regulator 13. In operation, high-pressure changeover regulator 13 processes gas input from one of inlets 16, 18 by reducing the pressure of the received gas to a predetermined level. The lower-pressure gas is then transmitted to low-pressure regulator 15 for further reducing the gas pressure to a level that is suitable for use in, e.g., an appliance. As shown in FIGS. 1 and 2, low-pressure regulator 14 includes an outlet 27 for transmitting the gas to the appliance.

To begin use, slide bar 19 is moved toward whichever inlet 16, 18 and container is to be used first, e.g., the "supply" container, thus making the container connected to the other inlet 16, 18 the "reserve" container. Thereafter, a main control valve on each of the gas storage containers is opened such that gas is supplied to both inlets 16, 18. Although both inlets 16, 18 receive gas from their respective gas storage containers, slide bar 19 operates an internal mechanism of a known nature (not illustrated) which selectively couples gas received through only one of the inlets 16, 18 to the regulator 10. After opening the main control valves on the gas storage containers, a full/empty indicator 22 attached to end 20 of high-pressure regulator 13 senses the pressure of the gas supplied by the selected storage container and, based on the sensed pressure, indicates the full/empty status of that container. As described in more detail below, indicator 22 provides a visual signal to a user that corresponds to the gas pressure in the tank that is selected with slide bar 19.

More particularly, full/empty indicator 22 includes a transparent polymeric capsule 44 (FIG. 3) for housing a bi-colored member 46 arranged to abut a resilient pressure sensitive element, e.g., a diaphragm 64 (FIG. 4), that is movable (i.e., resiliently flexed) in response to changes in pressure of the gas impinging thereon. Most of capsule 44 is ordinarily covered by a removable protective cap 26 such that only a ledge portion or indicator window 24 of capsule 44 remains exposed for viewing the bi-colored member 46. Depending upon its position, a different color of member 46 is displayed in window 24, thus indicating the full/empty status of the supply container.

Turning to FIGS. 2 and 3, a sensing apparatus 28 according to the present invention includes a generally cylindrical, tubular housing 29 that is attached to low-pressure regulator 13 to provide a signal indicative of whether the supply container is at or near empty based on the movement of diaphragm 64 of full/empty indicator 22. Housing 29 of sensing apparatus 28 is disposed over full/empty indicator 22 and includes a pair of resilient connector arms 30, 34 such that the arms extend parallel to the central axis of cylindrical housing 29 and away from an annular rim 31 at an open end 33 of housing 29. Each connecting arm 30, 34 includes a free end having a barb 32, 36, respectively, for engaging an edge 21 of high-pressure regulator 13 such that housing 29 can be readily "snapped" onto regulator 10, as shown in FIG. 2 and described below.

Slidably disposed within housing 29 is a coil spring 72 (FIGS. 3 and 4) that is seated between an interior end surface 74 of housing 29 and the top of a plunger 65 to bias the opposite end of plunger 65 against the inside end surface of the bi-colored member 46, which is generally cup-shaped. The top of plunger 65 includes a disc portion 69 having a top surface 70 that is preferably formed with a concave annular groove 71 disposed concentric to the circumference of disc 69 and sized for securely seating the end of spring 72 upon surface 70. Plunger 65 also includes a shaft portion 66 extending generally perpendicularly to disc 69 and having a free end 68 that, when sensing apparatus 28 is assembled, is urged against the aforementioned inside end surface 49 (FIG. 4) of multi-colored member 46 by spring 72. Shaft 66 can be molded integrally with disc 69 or attached thereto by conventional means; for example, by providing threads on shaft end 67 and forming a corresponding threaded receptacle in the center of disc 69.

Housing 29 of sensing apparatus 28 preferably includes a gripping portion 58, preferably integrally formed with housing 29, having a longitudinal opening 60 for accommodating a magnetically actuatable switch, e.g., a reed switch 76 (FIG. 4). To actuate switch 76, plunger 65, and preferably disc 69 of plunger 65, is comprised of or carries a magnetic material that generates a magnetic field sufficient to actuate switch 76 when it is within a predetermined distance from switch 76. A pair of leads 78 connected to reed switch 76 extend out of housing portion 29 for transmitting the signal generated by reed switch 76 to an indicating apparatus such as light 84, for notifying the user at a remote location that the selected supply gas container is at or near empty.

As shown in FIGS. 3 and 4, sensing apparatus 28 also includes a cylindrical sleeve 38 having an inside cylindrical surface 39 sized to fit over the outside of transparent capsule 44 of full/empty indicator 22. Cylindrical sleeve 38 also includes an outside cylindrical surface 41 sized to slidably but closely position sleeve 38 inside open end 33 of housing 29. Sleeve 38 acts as a retainer to keep plunger 65 and spring 72 in place within housing 29 and thus maintain sensing apparatus 28 as a unitary assembly.

With further reference to FIG. 3, to connect sensor apparatus 28 to regulator 10, cap 26 (FIG. 1) is removed from indicator 22 and the serially assembled sensing apparatus 28 is in effect substituted for cap 26 and locked onto full/empty indicator 22, without having to modify regulator 10 or indicator 22 in any way. According to the preferred embodiment, sleeve 38 is slidably disposed over transparent capsule 44 such that a rim 40 at the outer end of sleeve 38 abuts a rim 23 of indicator window 24 of capsule 44. Shaft 66 of plunger 69 enters capsule 44 through an existing atmospheric vent opening 56 in the top or outer end of capsule 44 and the free end 68 of shaft 66 engages surface 49 of multi-colored member 46. To lock the sensor assembly regulator 10, the barbs 32, 36 of resilient arms 30, 34 engage end 20 of high-pressure regulator 13. As housing 29 and its assembled components are pushed into place, arms 30, 34 flex outwardly, in a direction indicated by arrow "A" in FIG. 3, until barb 32 engages and locks behind edge 21, and barb 36 engages and locks behind an opposed edge (not shown) of high-pressure regulator 13. As a result, annular rim 31 of opening 33 of housing 29 seats against annular rim 40 of sleeve 38 (FIGS. 2 and 4). In sum, sensing apparatus 28 is retrofittable to conventional two-stage LP gas regulators having a mechanical full/empty indicator 22 of the type described above such that no modification to regulator 10 or indicator 22 is required. The operation of the sensing apparatus 28 and remote indicator is described in further detail with respect to FIG. 4.

When assembled onto regulator 22, sensing apparatus 28 utilizes the translational movement of the mechanical full/empty indicator 22 to generate a corresponding electrical signal and it transmits that signal on leads 78 to an indicator (not shown) arranged at a remote location, e.g., inside the cab of a recreational vehicle. When the selected supply container is full, the gas pressure sensed by mechanical indicator 22 (more particularly, diaphragm 22) is at its maximum. Therefore, diaphragm 64 expands (flexes laterally) and exerts a relatively large force on bi-colored indicator member 46, such that member 46 moves toward the outer end 54 of capsule 44, in a direction designated "B" in FIG. 4. As a result, indicator window 24 displays a portion of member 46 having a designated color indicating that the supply container is full. Typically, multi-colored member 46 includes two portions that can be readily snapped together including a cup-like portion 48 (green-colored) for indicating that the supply container is full and a tube-like portion 50 (red-colored) for indicating that the supply container is at or near empty. Of course, many such forms and indicator formats could be used.

As shown in FIG. 4, shaft 66 of plunger 65 is biased against cup-like portion 48 of member 46 by spring 72. Therefore, as diaphragm 64 expands and causes translational movement of member 46, diaphragm 64 correspondingly moves plunger 65 toward inside surface 74 of housing 29. This movement of plunger 65, and particularly magnetic disc 69, toward member 58 of housing 29 causes magnetically actuatable switch 76 to actuate (open or close). For example, under normal operating conditions when the supply container is generally full, sensing apparatus 28 may maintain switch 76 in a closed position. In that embodiment, switch 76 is a normally open switch that transmits a warning signal when plunger 65 and magnetic disc 69 move away and allow the switch to open, thus activating an indicator (described below).

Full/empty indicator 22 also includes a spring 52 seated against inside surface 55 of closed end 54 of transparent capsule 44 and an annular edge 62 of tube-like portion 50. Coil spring 52 insures that the inner or lower end extremity (as seen in FIG. 4) of indicator member 46 remains in contact with diaphragm 64, and its open center area allows shaft 66 of plunger 65 to extend through it to contact cup portion 48.

As the pressure of the gas impinging upon diaphragm 64 changes during use of an appliance depleting the gas supply, diaphragm 64 exhibits downward contracting movement (opposite "B" in FIG. 4). When the selected supply container is at or near empty such that the gas pressure sensed by diaphragm 64 is at some predetermined lower level high-pressure changeover regulator 13 automatically switches to the inlet 16, 18 connected to the reserve container (in FIG. 1, for example, inlet 18 is connected to the reserve container because inlet 16 is connected to the initially selected supply container). As a result, the reserve container, i.e., the "new" supply container, provides an uninterrupted flow of fuel to regulator 13.

As diaphragm 64 contracts as noted above, it causes translational movement of bi-colored member 46 within transparent capsule 44 to display second portion 50 of member 46 in window 24 of capsule 44. Because plunger 65 is biased against member 46 by spring 72, plunger 65 correspondingly moves downwardly due to the lower gas pressure sensed by diaphragm 64. As plunger 65 gets further from switch 58, the magnetic field acting on switch 58 becomes weak to non-existent and switch 76 opens. As a result, sensing apparatus 28 transmits a signal to a remote indicator, e.g., a lighting element mounted at an often-occupied location where the indicator is readily viewable, such as the cab or other interior location of a recreational vehicle. The indicator notifies the user that the supply gas container selected with slide bar 19 is at or near empty and should be refilled, even though the connected appliances continue to operate with gas from the "new" supply container, which previously was the reserve container.

Notably, even though gas is being supplied to regulator 10 from the reserve container, now acting as the supply, full/empty indicator 22 continues to display second portion 50 of member 46 (indicating that the original supply container is empty) because full/empty indicator 22 continues to sense the pressure of the gas from the "original" supply container. As mentioned earlier, the original supply container is determined by the position of slide bar 19. The full/empty indicator will continue to show the full-empty status of the gas tank selected by slide bar 19. Therefore, prior to removing the empty gas container, slide bar 19 is moved toward the inlet 16, 18 that is connected to the full container now acting as the new supply gas container. Diaphragm 64 will then sense the higher gas pressure of the new, full gas tank, and indicator window 24 will again display cup-like portion 48. Further, plunger 65 will again move close to switch 76 such that switch 76 will close and turn the indicator off to indicate that regulator 10 is receiving gas from a full gas storage container, thereby also indicating that the initial supply container can be removed and refilled. Indicator light 84 may be red to indicate that the tank is depleted. It is anticipated that a second indicator light, such as a green light, could also be electrically connected to switch on when light 84 is off to thereby provide a signal that the tank has sufficient gas pressure.

Figure 5:
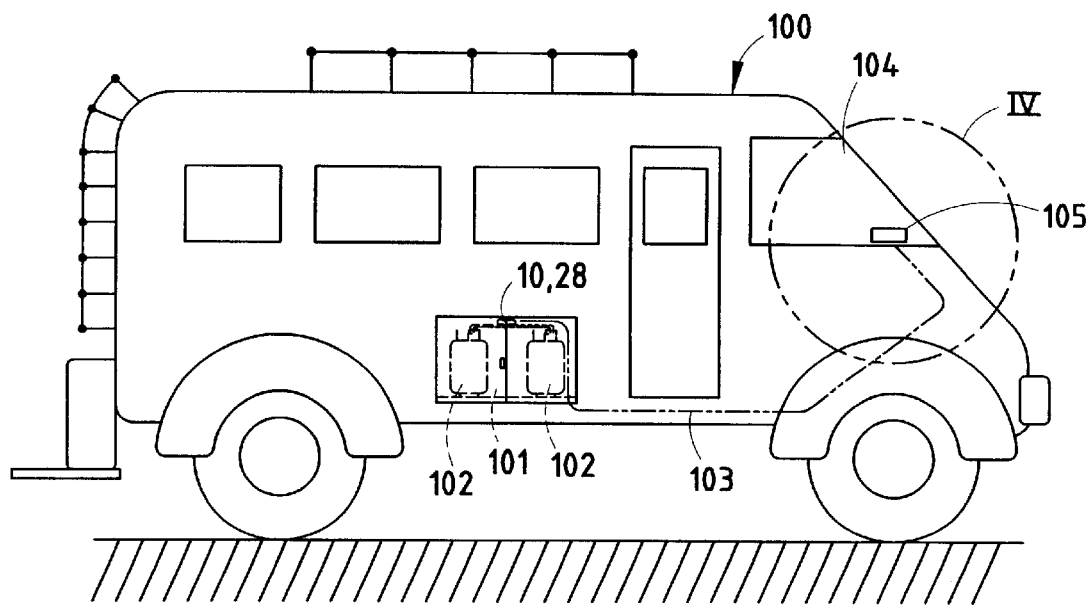
FIG. 5 is a partially schematic front elevational view showing the sensing apparatus and remote indicator installed in a recreational vehicle.
Figure 6:
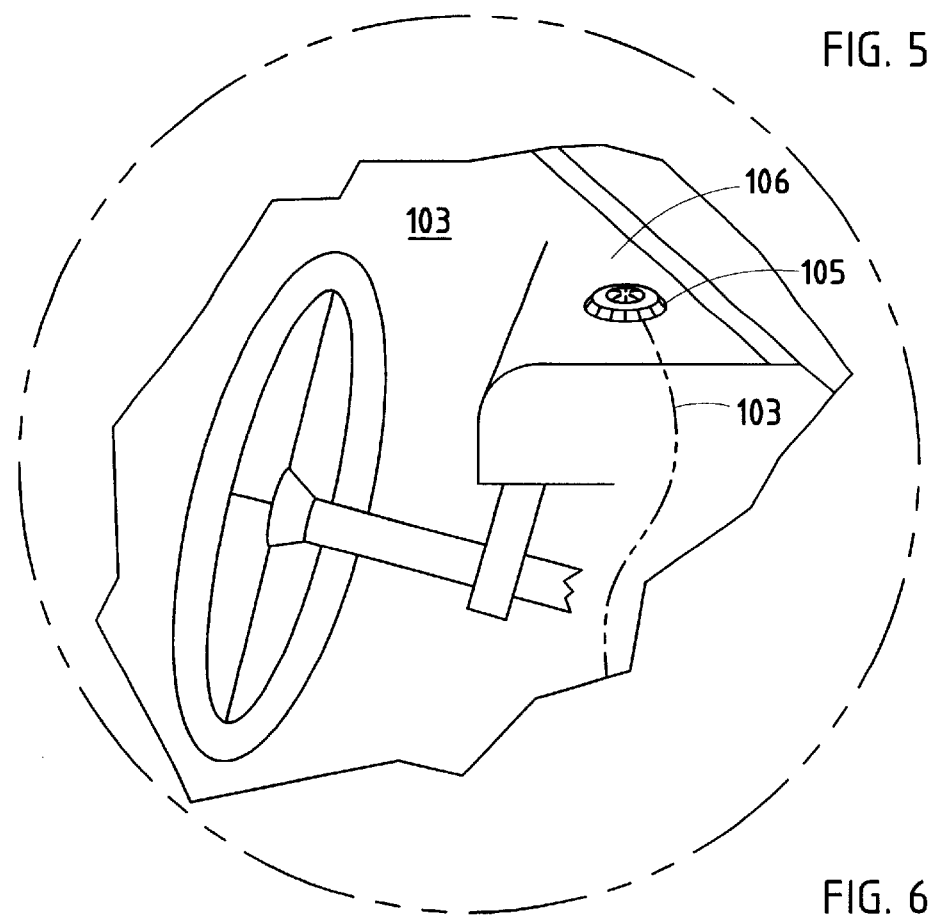
FIG. 6 is a partially fragmentary view of the vehicle of FIG. 5 showing the indicator light installed in the vehicle interior.

With reference to FIGS. 5 and 6, a recreational vehicle 100 includes a compartment 101 in which a pair of conventional LP gas cylinders 102 are mounted. In the illustrated example, the indicator light 105 is mounted on the vehicle dashboard 106 in the vehicle interior 104, and electrical wires 103 connect the indicator light 105 to the sensor apparatus 28, and the vehicle battery (not shown). As discussed above, indicator light 105 may be red to indicate that the gas storage tank is low or empty. Although the indicator light 105 is illustrated as being mounted to the vehicle dash, it is anticipated that the indicator light 105 could be mounted in a variety of different locations, either in the interior of the vehicle, or at a convenient exterior location. Furthermore, although the illustrated RV 100 is a motorized vehicle, it is anticipated that the sensing apparatus and remote indicator of the present invention could be utilized with a wide variety of vehicles having gas accessories, such as, for example, trailers, boats, or other types of non-motorized recreational vehicles.

The sensing apparatus 28 of the preferred embodiment has been described as being retrofittable to a conventional gas regulator such that it is disposed on an existing full/empty indicator 22. Clearly, sensing apparatus 28 could be manufactured as part of the regulator, in conjunction with a diaphragm, without requiring each component of the above-described apparatus associated with the full/empty indicator.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A gas pressure sensing apparatus and remote indicator for an automatic changeover gas regulator, comprising:
   a gas regulator having a plurality of selectable inlets, each inlet configured to receive pressurized gas from a different one of a plurality of pressurized gas storage containers, and an outlet for supplying gas to an appliance;
   a sensor that provides a signal indicative of a gas pressure in at least a selected one of said inlets corresponding to a pressurized gas storage container from which said selected one inlet receives pressurized gas, and a sensor housing for said sensor adapted to be releasably attached to said regulator;
   an indicator interconnected with said sensor and positionable at a location that is remote from said gas regulator to provide a signal to a user indicative of the gas pressure within at least said selected one of said inlets.

2. A gas pressure sensing apparatus and remote indicator as defined in claim 1, wherein said sensor housing includes at least one connector arm for releasably attaching said sensor housing to said regulator.

3. A gas pressure sensing apparatus and remote indicator as defined in claim 2, wherein said connector arm is resilient and integrally formed with said sensor housing, said connector arm including a free end having a barb integrally formed with said free end for engaging an edge of said regulator body such that said sensor housing may be snapped onto the regulator body and mounted thereon.

4. A gas pressure sensing apparatus and remote indicator for an automatic changeover gas regulator, comprising:
   a gas regulator having a plurality of selectable inlets, each inlet configured to receive pressurized gas from a different one of a plurality of pressurized gas storage containers, and an outlet for supplying gas to an appliance;
   a sensor that provides a signal indicative of a gas pressure in at least a selected one of said inlets corresponding to a pressurized gas storage container from which said selected one inlet receives pressurized gas;
   an indicator interconnected with said sensor and positionable at a location that is remote from said gas regulator to provide a signal to a user indicative of the gas pressure within at least said selected one of said inlets; and
   a pressure sensing member that shifts an indicating member upon changes of gas pressure in said selected inlet, and a sensor housing which fits over the outside of said indicating member.

5. A gas pressure sensing apparatus and remote indicator for an automatic changeover gas regulator, comprising:
   a gas regulator having a plurality of selectable inlets, each inlet configured to receive pressurized gas from a different one of a plurality of pressurized gas storage containers, and an outlet for supplying gas to an appliance;
   a sensor that provides a signal corresponding to a gas pressure in at least a selected one of said inlets corresponding to a pressurized gas storage container from which said selected one inlet receives pressurized gas;
   an indicator interconnected with said sensor and positionable at a location that is remote from said gas regulator to provide a signal to a user indicative of the gas pressure within at least said selected one of said inlets;
   said sensor including a pressure sensing member and an indicating member coupled thereto for translational movement upon changes of gas pressure in said selected inlet, said sensor further including a housing, a plunger, and a switching element, said plunger arranged in said sensor housing and cooperatively movable with said indicating member in response to the gas pressure sensed by the sensing member.

6. A gas pressure sensing apparatus and remote indicator as defined in claim 5, wherein at least a part of said plunger is magnetic for actuating said switching element when said plunger moves into proximity with said switching element to thereby generate said output signal.

7. A gas pressure sensing apparatus and remote indicator as defined in claim 6, wherein said plunger includes a disc and an elongated member having a first end attached to said disc and a free end arranged to abut a portion of the indicating member, such that said plunger moves collectively with the indicating member in response to the gas pressure sensed by the sensing member.

8. A gas pressure sensing apparatus and remote indicator as defined in claim 7, further including a spring positioned between an interior wall of said sensor housing and a surface of said disc for biasing said plunger against the indicating member.

9. A gas pressure sensing apparatus and remote indicator as defined in claim 8, wherein said disc includes a magnetic material and said shaft is a non-magnetic material.

10. A gas pressure sensing apparatus and remote indicator as defined in claim 5, wherein said switching element is a reed switch.

11. A gas pressure sensing apparatus and remote indicator for an automatic changeover gas regulator, comprising:

a gas regulator having a plurality of selectable inlets, each inlet configured to receive pressurized gas from a different one of a plurality of pressurized gas storage containers, and an outlet for supplying gas to an appliance;

sensor that provides a signal corresponding to a gas pressure in at least a selected one of said inlets corresponding to a pressurized gas storage container from which said selected one inlet receives pressurized gas;

an indicator interconnected with said sensor and positionable at a location that is remote from said gas regulator to provide a signal to a user indicative of the gas pressure within at least said selected one of said inlets; and said sensor including a biased member responsive to gas pressure changes at said selected one of said inlets for indicating whether a gas container connected to said selected one inlet is generally empty.

12. A gas pressure sensing apparatus and remote indicator as defined in claim 11, wherein said indicator is adapted to be mounted within a vehicle.

13. A gas pressure sensing apparatus and remote indicator as defined in claim 12, wherein said indicator is a lighting element.

14. A gas regulator sensing apparatus for sensing whether a gas container coupled to an inlet of a gas regulator is depleted, comprising:

a pressure sensitive member attachable to a gas regulator and movable between a plurality of positions in response to the pressure of the gas entering an attached regulator at its inlet;

a sensor housing having a switching element mounted thereto;

a switch actuator movably disposed in said sensor housing and biased against said pressure sensitive member to be collectively movable with said pressure sensitive member;

at least a portion of said switch actuator operatively coupled to said switching element in at least a selected one of said positions of its movability, for actuating said switch when at such position and thereby generating an electrical signal indicative of the gas pressure sensed by said pressure sensitive member;

an indicator responsive to said signal for indicating whether the gas container is depleted, said indicator disposed at a position remote from said switching element; and said actuator including a magnetic portion and said switch being magnetically actuable.

15. A sensing and indicating apparatus for a changeover gas regulator which regulates gas input from at least two gas storage containers, which has at least two inlets, each connectable to a different gas container, and which further has a full/empty indicator arranged adjacent at least a selected one of its inlets that includes a member movable in response to a change in gas pressure of the gas input at said selected inlet, said sensing and indicating apparatus comprising:

a housing adapted to be releasably attached to the regulator and disposed adjacent to the full/empty indicator;

a sensor mounted on said housing, said sensor responsive to the movement of said member of the full/empty indicator for generating an output signal indicative of the gas pressure in a gas container connected to said regulator; and indicator responsive to said output signal for indicating whether the connected gas container is depleted, said indicator arranged remote from the housing and sensor.

16. A method of retrofitting an automatic changeover gas regulator having at least two gas inlets and a movable member that shifts in response to the presence of pressurized gas within the gas regulator to indicate the state of the gas within the regulator, the gas regulator inlets being respectively connectable to a pair of compressed gas containers mounted to a recreational vehicle; the method comprising:

connecting a switch to the gas regulator in a manner that provides an electrical signal based upon the position of the movable member;

connecting an indicator to the switch that provides an indication to a user corresponding to the position of the movable member and gas pressure within the regulator; and positioning the indicator on the vehicle at a location that is remote from the gas regulator.

17. The method of claim 16, wherein:

the indicator is positioned within the vehicle.

* * * * *